Nov. 29, 1927.

G. ZEHNLE 1,650,735

CLEVIS HOOK

Filed Nov. 19, 1924

Inventor
George Zehnle
By D. Swift
Attorney

Patented Nov. 29, 1927.

1,650,735

UNITED STATES PATENT OFFICE.

GEORGE ZEHNLE, OF QUINCY, ILLINOIS.

CLEVIS HOOK.

Application filed November 19, 1924. Serial No. 750,919.

The invention relates to clevis hooks, and has for its object to provide a device of this character formed from oppositely disposed U-shaped members having one pair of their arms pivoted together, and terminating in outwardly extending registering hooks adapted to extend through spaced apertures in a draft bar.

A further object is to provide a pivoted finger between the pivoted arm, which pivoted finger engages the ends of the hooks and forms means for preventing the hooks from coming out of the apertures of the draft bar.

A further object is to position the free arms of the U-shaped members whereby when the hooks are in the draft bar and in registration, said arms will engage each other after passing through an aperture of a farm implement which is to be moved forwardly.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
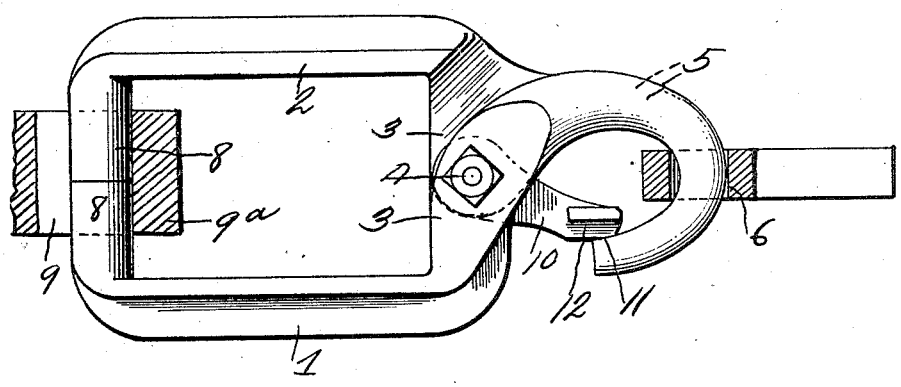
Figure 1 is a side elevation of the clevis.
Figure 2:
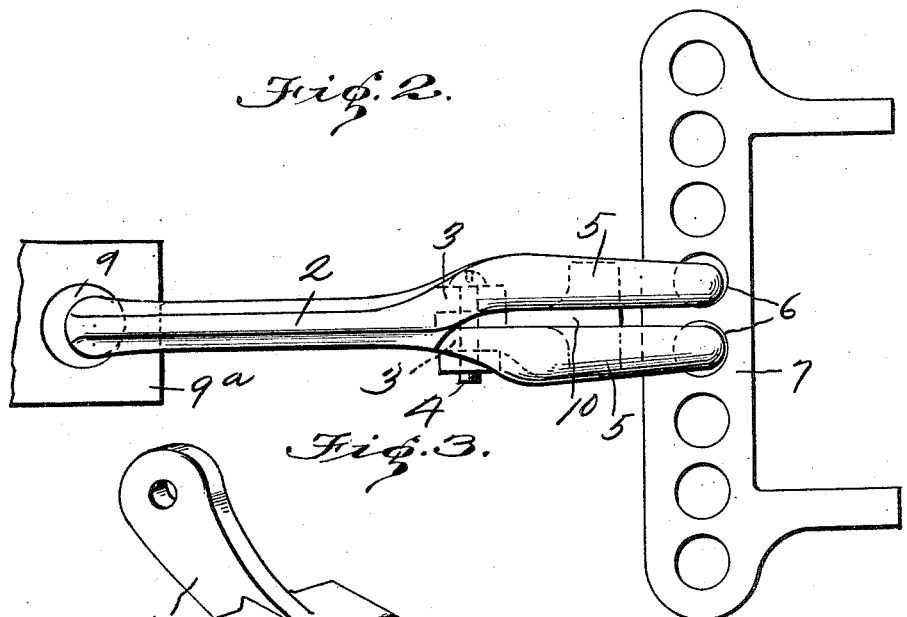
Figure 2 is a top plan view of the clevis, showing the same in position for use.
Figure 3:
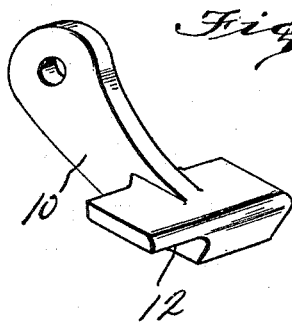
Figure 3 is a perspective view of the pivoted latching finger.

Referring to the drawing, the numerals 1 and 2 designate oppositely disposed U-shaped members, the arms 3 of which overlie each other and are pivotally connected together at 4. Arms 3 terminate in outwardly extending hooked arms 5, which register with each other and are adapted to be disposed in spaced apertures 6 of a draft bar 7, which may be carried by a tractor or any other suitable vehicle. When the arms 5 are in registration as shown in Figure 1, the arms 8 of the U-shaped members 1 and 2 engage each other and are in alinement, therefore it will be seen that when draft is applied to the device with the arms 8 extending through an aperture 9 of the bar 9ª, which may be attached to a plow or other farm implement, the U-shaped members will remain in relative position. However as tractors and vehicles or articles pulled thereby move over rough and uneven ground, there is danger of the hooks 5 working out of the apertures 6, and to obviate this difficulty a pivoted finger 10 is provided, which is pivotally connected at 4 between the adjacent overlapped ends of the arms 3, and which pivoted finger extends outwardly, and engages the inner sides of the hooked members 5 at 11, and prevents the hooks from coming out of the apertures 6 under normal working conditions.

When it is desired to remove the hooks from the apertures 6, the operator places his finger in the recess 12 and forces the pivoted finger 10 upwardly, thereby allowing the clevis to be tilted and hooks 5 removed from the apertures 6. It will also be seen that the recess 12 may be eliminated if desired, and after the hooks have been removed from the apertures 6, the U-shaped members 1 and 2 may be spread apart for removing the arms 8 from the aperture 9 of the bar 9ª.

From the above it will be seen that a clevis hook is provided, which is simple in construction, provided with double hooks for hooking into spaced apertures of a draft bar, and that a single pivoted finger is provided for cooperating with both hooks and maintaining said hooks in the spaced apertures of the draft bar.

The invention having been set forth what is claimed as new and useful is:—

A clevis hook comprising opposed U-shaped members in the same plane, arms of said U-shaped members extending towards each other and engaging in axial alinement, the other arms of said U-shaped members being overlapped, a pivot bolt extending through said overlapped arms, registering hooked members carried by said overlapped arms, said hooked members being spaced from each other and spaced outwardly from the plane of the opposed U-shaped members, a finger pivoted between the overlapped arms and extending outwardly, said finger being provided with lugs extending outwardly at opposite sides thereof and adapted to simultaneously engage both of the hooked members.

In testimony whereof I have signed my name to this specification.

GEORGE ZEHNLE.